S. McElfatrick.
Inclined Railroad.
Nº 9,329.                                     Patented Oct. 12, 1852.
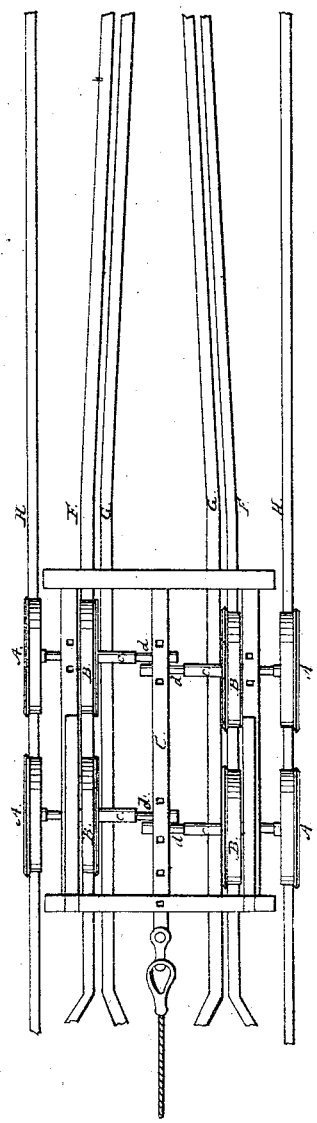
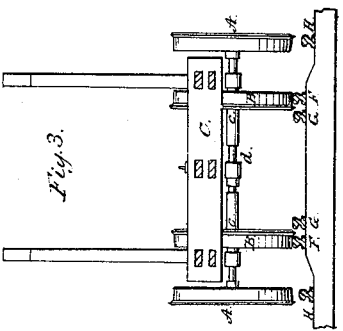
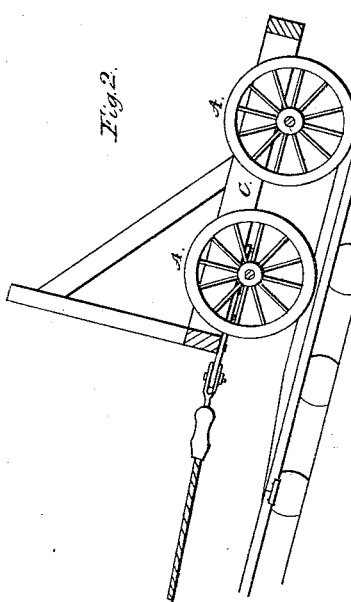

UNITED STATES PATENT OFFICE.

SAMUEL McELFATRICK, OF DAUPHIN, PENNSYLVANIA.

APPARATUS FOR TRANSPORTING TRAINS ON INCLINED PLANES OF RAILROADS.

Specification of Letters Patent No. 9,329, dated October 12, 1852.

*To all whom it may concern:*

Be it known that I, SAMUEL McELFATRICK, of Dauphin, Pennsylvania, have invented a certain new and useful Improvement in the Apparatus for Transporting Trains on Inclined Planes on Railroads, and that the following is a full, clear, and exact description thereof, reference being had to the accompanying drawings, making part of this specification, in which—

Figure 1, is a plan of a track and pit with my improved " safety car " (as it is called) against which the train abuts in ascending and descending; Fig. 2 a side elevation; and Fig. 3, a cross section.

The same letters indicate like parts in all the figures.

The object of my invention is to produce an arrangement by which trains of cars may be transported over inclined planes on railroads without the necessity of connecting or disconnecting the cars or locomotive, and without danger or any very considerable loss of time.

My invention relates to the arrangement of the running gear of the " safety car " in combination with the construction of the track, and consists in making each axle of the safety car in two parts, each part having a separate bearing, and providing them with an auxiliary set of wheels within and corresponding with the main wheels, the said auxiliary wheels as the train descends running upon an elevated track located between the rails of the ordinary track and raising the ordinary wheels from the main track while at the same time the convergence of the rails of the elevated auxiliary track causes the auxiliary wheels to approach each other, and in consequence of the independent journals of the divided axles, the main wheels are caused to approach each other and are brought into the space between the rails of the ordinary track and the car continues to descend the inside track into what is called the " pit " while the train passes onto the horizontal track.

In the accompanying drawings H, H, represent the rails of an inclined plane of a railroad which become horizontal at the point *a*. In order to enable a train of cars with its locomotive to descend onto the horizontal track they are caused to abut against what is called the safety car C which is in connection with the stationary power at the top of the inclined plane. At the lower end of the inclined plane an auxiliary track F, G, is built, which continues on in the same inclined direction into what is called a pit under the horizontal track to a depth sufficient to receive the safety car. This auxiliary track is elevated at its upper end a few inches above the main track so that when the auxiliary wheels B, B, B, B, on the axles *c, c, c, c,* of the safety car come upon it the flanges of the main wheels A, A, A, A, (which are on the outside) are raised clear of the main track. As the rails F, G, of the auxiliary track (which are made double for the purpose of safety, and to cause the wheels to approach each other gradually) converge toward each other it is obvious that the main wheels A, A, A, A, are brought within the space between the rails of the main track and above it on account of the inner journals *d, d, d, d,* being free to play in and out in boxes in the cross piece C, of the safety car. The rails of the auxiliary track having converged sufficiently to clear the main wheels of the main track continue on parallel to reach down into the pit where the safety car remains while the train passes on to the horizontal track and goes on its way.

I do not claim as my invention dividing the axles of the car, and providing the inner ends of the two parts with independent journals, as this has before been done; neither do I claim the use of an auxiliary track running down into a pit. But

What I claim as my invention and desire to secure by Letters Patent is—

Making the axles of the safety car in two parts, the inner end of each part being provided with an independent journal constructed and operated as described, when this is combined with the auxiliary wheels and auxiliary converging track and pit substantially in the manner and for the purpose specified.

SAML. McELFATRICK.

Witnesses:
HENRY D. GREENANSEL,
JOHN HERTZ,
JAMES BROWN.